United States Patent [19]

Exner et al.

[11] 4,149,930

[45] Apr. 17, 1979

[54] METHOD AND APPARATUS FOR MAKING ASBESTOS-CEMENT BOARDS

[75] Inventors: Günter Exner, Dettelbach; Leon G. Rzepka, Misburg, both of Fed. Rep. of Germany

[73] Assignee: Fulguritwerke Seelze und Eichriede in Luthe bei Hannover Adolf Oesterheld, Luthe, Fed. Rep. of Germany

[21] Appl. No.: 895,051

[22] Filed: Apr. 10, 1978

Related U.S. Application Data

[63] Continuation of Ser. No. 651,426, Jan. 21, 1976, abandoned.

[30] Foreign Application Priority Data

Jan. 22, 1975 [DE] Fed. Rep. of Germany ....... 2502352

[51] Int. Cl.$^2$ .............................................. C04B 15/16

[52] U.S. Cl. .................................... 162/154; 162/199; 162/217; 162/279; 162/299; 162/304; 162/314; 162/315; 162/320; 162/343; 162/361; 162/368; 162/396

[58] Field of Search ............... 162/304, 154, 199, 217, 162/279, 299, 336, 343, 315, 396, 320, 319, 314, 367, 361, 362, 368, 120; 52/660, 749

[56] References Cited

U.S. PATENT DOCUMENTS

| | | | |
|---|---|---|---|
| Re. 28,269 | 12/1974 | Hill et al. | 162/343 |
| 141,358 | /1873 | Keely | 162/305 |
| 1,599,385 | 9/1926 | Pryor | 162/320 |
| 2,073,654 | 3/1937 | Smiley | 162/320 |
| 2,083,819 | 6/1937 | Berry | 162/205 |
| 2,235,176 | 3/1941 | Schless | 162/120 |
| 2,972,378 | 2/1961 | Nuyens | 162/205 |
| 3,047,457 | 7/1962 | Knauf | 162/152 |
| 3,190,790 | 6/1965 | Ploetz et al. | 162/320 |
| 3,325,350 | 6/1967 | Veryly | 162/320 |
| 3,859,163 | 1/1975 | Hawthornthwaite | 162/279 |

FOREIGN PATENT DOCUMENTS

| | | | |
|---|---|---|---|
| 198605 | 7/1958 | Fed. Rep. of Germany | 162/305 |

OTHER PUBLICATIONS

"A Dict. of Paper & Papermaking Terms," La Barre, (1937), pp. 111, 112, 124.

*Primary Examiner*—S. Leon Bashore
*Assistant Examiner*—Peter Chin
*Attorney, Agent, or Firm*—Gilbert L. Wells

[57] ABSTRACT

An improvement in the method and apparatus for fabricating asbestos-cement boards, wherein a felt band coated with fiber fleece is fed to a pair of press rollers in nip relationship and wherein the coating of the felt band with fiber fleece is effected by wet deposition on the felt band and by suction from the side opposite same.

The fiber fleece obtained by wet deposition on the felt band following the deposition is condensed and dehydrated by a system consisting of a sieve cylinder and of an associated suction roller operating in nip relationship.

11 Claims, 3 Drawing Figures

METHOD AND APPARATUS FOR MAKING ASBESTOS-CEMENT BOARDS

This is a continuation of application Ser. No. 651,426, filed Jan. 21, 1976 abandoned.

CROSS REFERENCE TO A RELATED APPLICATION

Applicants claim priority under 35 U.S.C. 119 for Application P 25 02 352.3, filed Jan. 22, 1975, in the Patent Office of the Federal Republic of Germany.

BACKGROUND OF THE INVENTION

The present invention relates to a method for making fiber boards, especially asbestos-cement boards, wherein a felt band covered with a fiber fleece is fed to a pair of pressure rollers in nip relationship, the covering of the felt band by the fiber fleece taking place by deposition on the felt band and by suction from the other side of same.

As regards a prior art method of this kind, provision is made for only a single wet deposition box with one suction head for attracting the fiber fleece to the felt band.

This prior art method suffers from the drawback that because of the single vacuum head, the fiber fleece cannot be subjected to sufficient dehydration, and further adequately constant layer thickness is not feasible.

As regards another prior art method, the deposition of the fiber fleece on the felt band takes place not by wet deposition, but rather by means of a sieve cylinder rotating in a sieve box containing the mixture of water and asbestos-cement.

This latter prior art method suffers from the drawback that the sieve cylinder accepts only relatively low concentrations of solids, so that the mixture of water and asbestos-cement (the asbestos-cement sludge) must be relatively thin in the sieve cylinder box. This allows the fibers of the asbestos-cement sludge to align themselves in the direction of motion when they pass through the sieve cylinder, and therefore asbestos-cement boards or products are obtained which are of anisotropic strengths. The thinness in this latter prior art method also is determined among other causes by the relatively small drying arc of the sieve cylinder.

Another drawback of this latter prior art method consists in the tendency of a thin asbestos-cement sludge tending to precipitate, so that this un-mixing must be prevented by stirrers mounted in the sieve cylinder box. These stirrers must rotate at relatively high rpms and thereby generate turbulence in this box.

Such turbulence disadvantageously leads to uneven thickness of the layer formed in the sieve cylinder and hence to uneven thicknesses and/or densities in the boards so made.

The unevenness of the fabricated boards also extends to their structures because the turbulence generated by the stirrers leads to flocculations in the asbestos-cement sludge.

SUMMARY OF THE INVENTION

Having in mind the limitations of the prior art, it is an object of the present invention to provide a method of the kind mentioned initially, which allows the fabrication of flawless fiber fleece or web of even thickness and for flawless compaction and dehydration.

Two embodiments are provided to achieve this objective.

On the one hand, the object is achieved by the present invention in that the fiber fleece obtained by wet deposition on the filter band is condensed and dehydrated following the wet deposition by equipment consisting of a sieve cylinder and an associated suction roller operating in nip relationship.

One achieves in this manner good dehydration and also the required precondensation by passing the material through this equipment. Such passage between the two compressed rollers furthermore provides a constant board thickness during the dehydration and precondensation procedure, there further being the possibility of adjusting the board thickness by changing the gap between the two rollers while simultaneously changing the partial vacuum in the wet deposition process.

The same objective is achieved by providing suction during the wet deposition process which takes place with varying partial vacuum over the particular length of the felt band being coated during the wet deposition process.

It is possible in this manner to fabricate fiber boards of constant thickness and to obtain good dehydration by means of the adjustable partial vacuum acting over a wide region of the felt band travel. It is possible for instance to let the partial vacuum increase continuously in the direction of motion in relation to the increasing thickness of the fiber fleece or in given propertions as a function of the composition of the asbestos-cement sludge, in order to achieve constant layer thickness along the length of the felt band being processed.

Both methods have the advantage with respect to known methods that fiber products and especially asbestos-cement boards are made, which are constant in structure, thickness and density.

A further advantage of the method of the present invention consists in the feasibility of employing a relatively thick sludge because an additional and externally acting force is made to bear during the suction procedure in order to deposit the fiber fleece on the felt band, namely the partial vacuum. This is in contrast to the process using a sieve cylinder for the deposition, the latter taking place merely by the hydrostatic pressure predetermined by the dimensions of the sieve cylinder box, which pressure is relatively low. Thus all the drawbacks resulting from the thinness of the asbestos-cement sludge are eliminated by the process of the present invention.

Furthermore, the fiber fleece according to the method of the present invention is kept on the felt band in the random state of the asbestos-cement sludge, that is, in its instantaneous position or orientation. An alignment of the fibers, such as takes place in the prior art method, therefore occurs in that of the present invention only to a much lesser degree because the sucked fibers essentially are maintained in place in their initial wet deposition orientation by the suction onto the felt band and are carried away in this orientation.

Lastly, the embodiments of the present invention hold the advantage that in contrast to the prior art, only small amounts of old material accumulate, that is, only minute amounts of solid are present in the filtrate water.

Lastly, the method of the present invention allows appreciable improvement in output when compared with the methods cited initially.

The two embodiments of the method of the present invention also may be applied in common in especially advantageous manner, that is, besides the described differential use of partial vacuum, one may also additionally carry out the condensation and dehydration by means of the sieve cylinder and suction roller operating in nip relationship.

In order to achieve even thickness across the width of the fiber boards to be made, it is of especial advantage that suction during the wet deposition procedure be carried out with a different partial vacuum across the particular width of the felt band being processed.

This provides the feasibility of adjusting the partial vacuum in a variable region across the width of the felt band so that even thickness of the boards to be made can be ensured as a function of the composition of the asbestos-cement sludge, of the production rate, of the fiber size, of the filter impedance of the felt band etc.

In apparatus designed to carry out the method of the present invention, and comprising a wet deposition box to coat one side of the felt band with fiber fleece and on the opposite side of which there is a suction box, a system consisting of a sieve cylinder and suction roller operating in nip relationship follows in advantageous manner the wet deposition box for the purpose of condensation, dehydration and fabrication of constant board thickness.

However, in lieu of the system of sieve cylinder and couch roll, it is also possible to replace the suction box by a row of such boxes extending across the particular length of the felt band being processed, the individual boxes of this row operating at different partial vacuums.

Again, in an especially advantageous manner, it is also possible to employ the system of sieve cylinder and couch roll together with the row of suction boxes.

Besides the advantages discussed with respect to the methods of the present invention, this equipment holds the further advantage that, in contrast to the known equipment in which the sieve cylinder is loaded by the fiber fleece, it suffers much less from fouling. This is so because the known apparatus ordinarily must be shut off about one hour at least every twenty-four hours for the purpose of cleaning the sieve cylinder. The apparatus of the present invention does not require such shutoff. Lastly the apparatus of the present invention holds the advantage that it is much more compact than the prior art apparatus and is built correspondingly more economically.

Because of the independent operation of the individual boxes of the row of suction boxes with respect to partial vacuum, it becomes feasible as an example, to continuously increase the partial vacuum in the direction of motion in relation to the increasing thickness of the fiber fleece, or in given proportions depending on the kind and composition of the asbestos-cement sludge in the wet deposition box.

On the other hand, it may be desirable sometimes to set a larger partial vacuum at the first suction box in the direction of motion than that in the last one, if a flow is produced in the manner described further below in the wet deposition box which is larger in the region of the first suction boxes than in that of the last ones.

It is of special advantage that the individual boxes of the row of suction boxes be further subdivided across the width of the felt band into further individual boxes actuated by partial vacuum independently from one another. In this manner the partial vacuum may be practically adjusted simultaneously and continuously both across the width and across the processed length of the felt band, and any situation may be dealt with.

It is of advantage to so arrange the wet deposition box and the row of suction boxes that the felt band will pass approximately vertically from bottom to top through this arrangement. One eliminates thereby any leakage problems at the upper end of the wet deposition box or of the row of suction boxes. Also, great compactness is thus achieved.

On the other hand, the apparatus of the present invention also permits an arrangement of the wet deposition box and the row of suction boxes so that the felt band passes at a slant to the horizontal from bottom to top through this apparatus. The slope of the wet deposition box and of the row of suction boxes may be adjusted.

The particular optimum slope of the apparatus consisting of wet deposition box and row of suction boxes may be set depending on the kind of material used, on the consistency of the substance in the wet deposition box, on the kind and design of the suction boxes and also on the partial vacuum being used. The arrangement may be such that subsequent adjustment of the slope if necessary also may be feasible during operation.

Appropriately the wet deposition box and the row of suction boxes are mounted in a structure of which the vertical posts run parallel to one another and are each jointedly supported at their lower ends on fixed parts of the structure, their upper ends being jointedly connected by a traverse, so that they form a quadrilateral linkage. The posts and hence the row of suction boxes and the wet deposition box are pivoted in order to adjust the particular slope, the posts moving in the manner of a parallelogram with respect to one another. The posts then may be clamped in their particular positions.

Advantageously, at least one deflecting roller of the felt band is mounted at the lower end of the system of wet deposition box and row of suction boxes, in the vicinity of a joint. In this manner, the pre-stress on the felt band is little changed at least for small slopes, and therefore small slopes are possible without further constructional alterations. In order to maintain the prestress in the felt band at larger slopes, the associated deflecting rollers of the felt band must be corrected simultaneously with the slope settings of the structure. To that end, at least one further deflecting roller for the felt band is appropriately mounted on the inside or outside of a post so as to be displaceable in height.

The apparatus of the present invention allows exchanging the wet deposition box with minimal labor for the purpose of processing different band widths. Again, the advantage of the apparatus of the present invention with respect to the prior art comprising a sieve cylinder box lies in the costly and laborious procedure of the prior art when changing the sieve cylinder. Appropriately the wet deposition box is supported on brackets mounted to the posts of the structure and detachably connected to these.

The desired random arrangement of the fibers on the felt band and maintaining them in such random orientations are achieved especially when a flow velocity and/or direction is imparted to the asbestos-cement sludge in the wet deposition box which does correspond to that of the felt band in the region of the box. Various possibilities are available to induce such a flow velocity. For instance, at least one circulating pump may be mounted in the wet deposition box to generate the required flow rate.

However, it is of especial advantage to mount a shield in the wet deposition box opposite the felt band and spaced parallel to the latter, so as to form a flow channel between it and the felt band. Such a shield may be made to be transverse to the lengthwise axis of the felt band and/or be adjustable in the angle it subtends with respect to the band, so that the channel cross-section is adapted to the particular conditions. It is appropriate to provide the shield at its lower end with a curved rim favoring inflow. Lastly, the shield is advantageously designed as an elastic membrane in order to compensate pressure fluctuations or any uneven or pulsating flows.

This shield causes such a flow in the channel between it and the felt band that the removal of the amount or part of water in the channel sucked into the suction boxes, that less of the total amount of material from the asbestos-cement sludge is moved upward, whereby there is less liquid in the channel than in the main chamber, so that a flow of the asbestos-cement sludge in the channel is induced.

This flow, or its velocity, may be affected and controlled by adjusting the shield in the described manner both with respect to its spacing and to its slope.

Lastly, stirrers may be mounted in known manner in the wet deposition boxes to eliminate un-mixing, these stirrers rotating however at lesser rpms if desired than in the prior art apparatus.

Further drying boxes appropriately follow the system consisting of wet deposition boxes and of the row of suction boxes.

In order to further dehydrate and simultaneously condense, the drying boxes are followed by an arrangement consisting of a sieve cylinder associated with a couch roll. It may be of advantage in this respect that the couch roll also be designed as a suction roller operating by partial vacuum. Partial vacuum operation allows easier removal of the condensed fiber fleece from the sieve cylinder to which it was previously pressed, so that it will adhere to the felt band.

Appropriately, the sieve cylinder and the couch roll are supported in the structure holding the wet deposition box and the row of suction boxes, and may be adjusted together with this structure.

Advantageously, a washing system may preceded the wet deposition box and the row of suction boxes, this system being used for the felt band and consisting of a washing suction apparatus, an acid basin, a further washing suction apparatus and a dry suction apparatus.

In order to obtain larger layer thicknesses and/or condensations and dehydration rates, several arrangements consisting of wet deposition boxes and rows of suction boxes, as well as of sieve cylinders and couch rolls, may sequentially follow one another. It is appropriate in this respect that a lower cloth circulate in the region of such an arrangement for the purpose of accepting the fiber fleece and transmitting same to the felt band which traverses this arrangement only between the sieve cylinder and the couch roll. In this manner the felt band already deposited once with the fiber fleece need not cross another arrangement and thus one avoids any difficulties there might be with such a further step.

It is of advantage that a washing system be provided for the lower cloth in each individual arrangement, the system consisting of a washing suction apparatus, an acid basin, a further washing suction apparatus and of a drying suction apparatus.

The apparatus of the present invention also may be applied to other fiber or asbestos-cement products, for instance to the manufacture of pipes or to that of boards with longitudinal structures. It is furthermore possible to use the apparatus of the present invention for the dehydration or dehumidification of other paste-like substances or muds such as are found in sewage facilities in order to reover wastes.

BRIEF DESCRIPTION OF THE DRAWINGS

The present invention is discussed in further detail below by means of the embodiments shown in the drawings; wherein.

DESCRIPTION OF THE PREFERRED EMBODIMENTS

Figure 1:
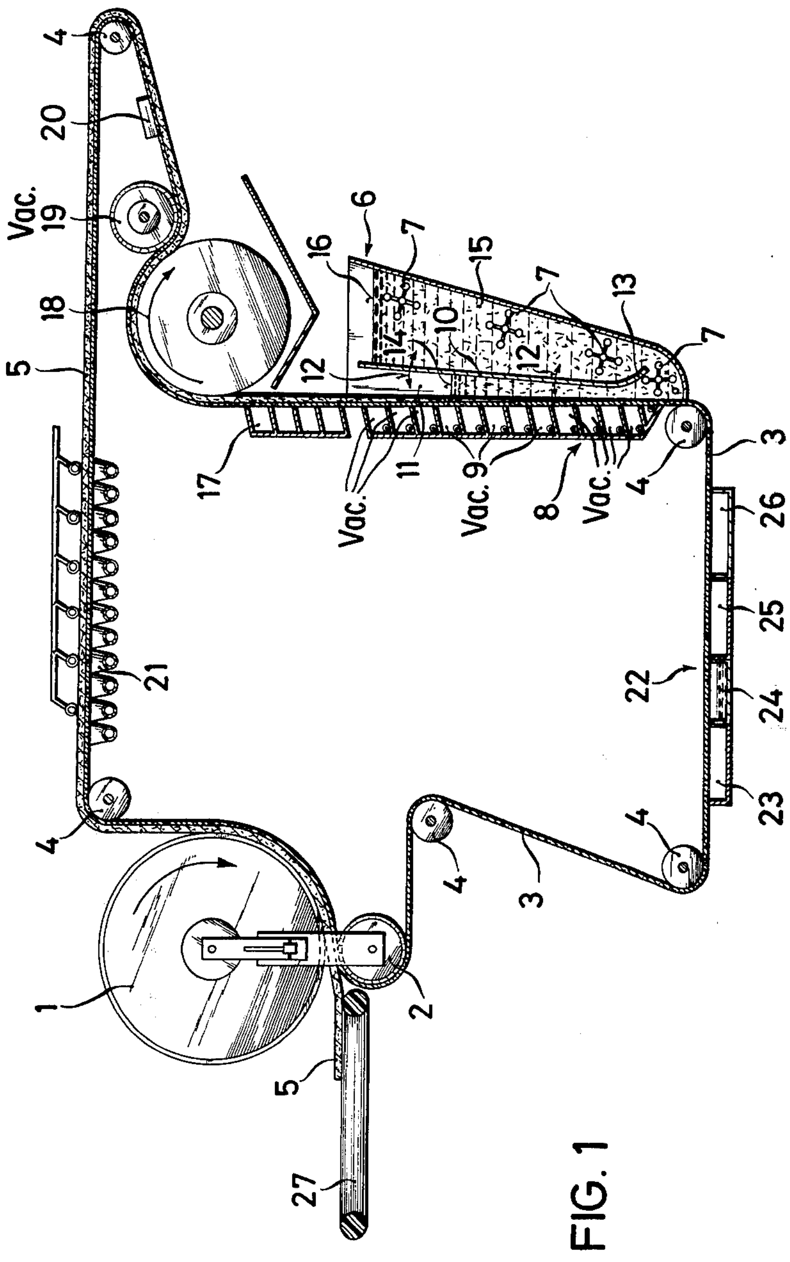
FIG. 1 is a schematic side view of an embodiment of the apparatus of the present invention.

FIG. 1 shows a pressure roller 1 and a second pressure roller 2, either or both of which may be driven. Fiber fleece 5 is fed to pressure roller 1 and pressure roller 2 by means of a revolving felt band 3 passing between said pressure rollers in nip relationship and guided by various deflecting rollers 4. The felt band is removed by conveyor belt 27.

Deposition of the fiber fleece 5 on felt band 3 is effected by a wet deposition box 6 mounted on one side of the felt band and containing stirrers 7. A row 8 of suction boxes is mounted on the opposite side of the felt band, consisting of individual suction boxes 9 operating independently from one another with partial vacuum. Individual boxes 9 are sequentially mounted in the direction of motion. They may be further divided into individual boxes across the width of the felt band transversely to the direction of motion, these further boxes operating independently from one another with partial vacuum.

In the embodiment of FIG. 1, wet deposition box 6 and row 8 of suction boxes are arranged so that felt band 3 nearly vertically passes from the bottom to the top through this system. However, slanting this equipment consisting of wet deposition box 6 and row 8 of suction boxes in the manner to be described further below is also feasible.

A shield 10 is mounted in wet deposition box 6 opposite felt band 3 and parallel to same, forming a flow channel 11 between itself and the felt band. Shield 10 may be adjusted transversely to the longitudinal axis of the felt band and/or with respect to the angle subtended with same, in the direction of arrows 12. The shield is provided at its bottom with a curved rim 13. Shield 10 may also be designed to be an elastic membrane.

Operation of the described apparatus is as follows:

Shield 10 causes a flow in channel 11 on account of part of the water being removed by means of suction boxes 9, so that less of the total amount of the asbestos-cement sludge is moved upward and a lower liquid level 14 results in this channel. To clarify by means of an illustration, the liquid level in main chamber 15 is designated by 16 and shown in dashed lines. Thereby a pressure difference between channel 11 and main chamber 15 occurs, so that the asbestos-cement sludge flows upward from channel 11. In this manner one obtains a flow velocity which at least with respect to direction is adapted to the transport velocity of felt band 3. This allows suction boxes 9 to evenly fix the fibers flowing past in their particular instantaneous orientations, whereby one eliminates the drawback of fiber alignment of the prior art method.

Further, dry suction boxes 17 are connected downstream of wet deposition boxes 6 and row 8 of suction boxes.

For further dehydration and simultaneous condensation, the drying suction boxes 17 are followed by a system consisting of a sieve cylinder 18 associated with a suction roll 19. In the embodiment illustrated, suction roll 19 also is designed as a suction roller operating by means of partial vacuum so that the condensed fiber fleece may be more easily removed from the sieve cylinder 18 by means of the felt band.

A further drying system 20 and also dehydration apparatus 21 operating with partial vacuum may be mounted behind sieve cylinder 18 and suction roll 19.

A washing system 22 for felt band 3 precedes wet deposition box 6 and row 8 of suction boxes, consisting of a washing suction apparatus 23, an acid basin 24, a further washing suction apparatus 25 and a drying suction apparatus 26.

Figure 2:
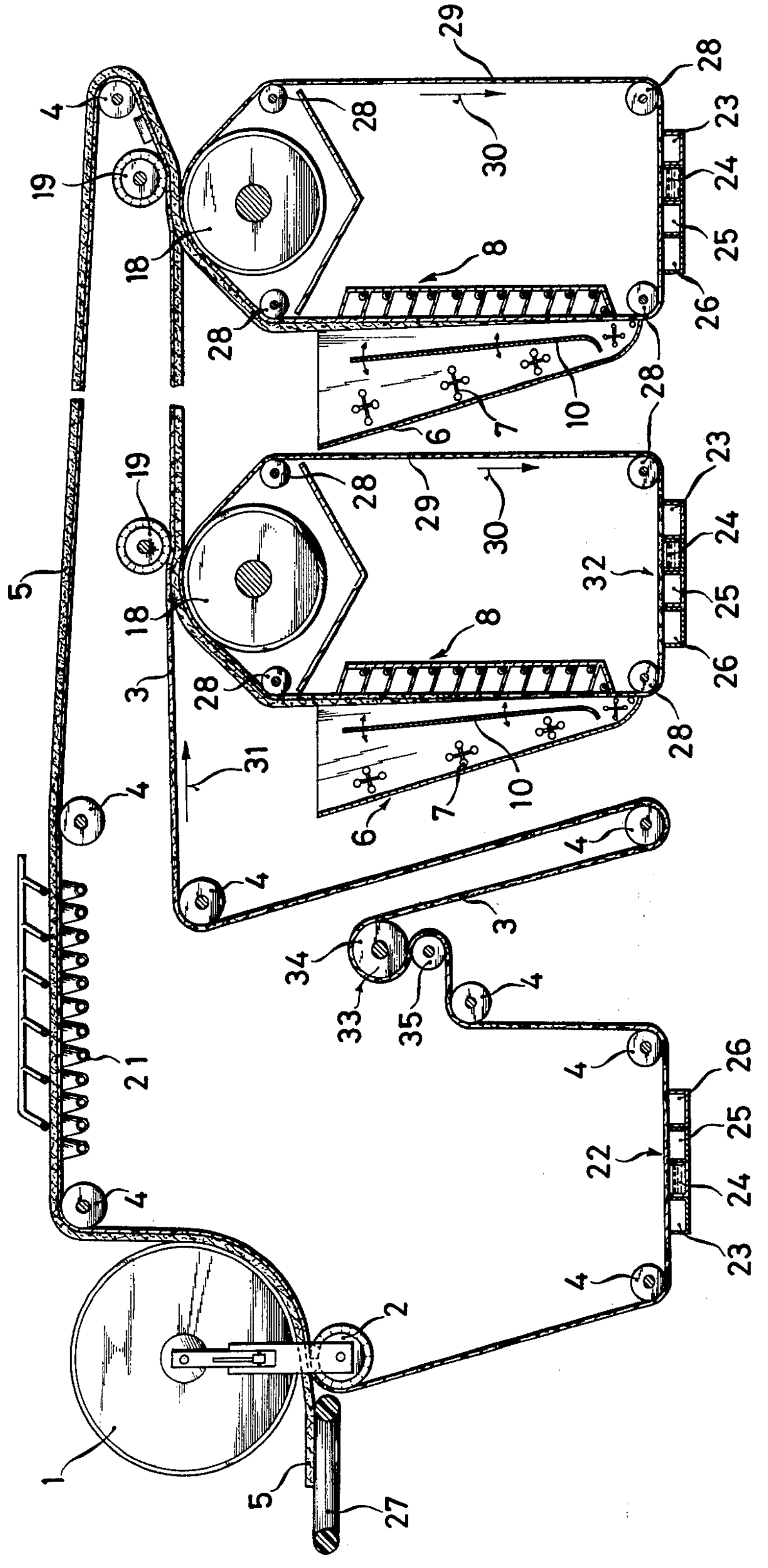
FIG. 2 is a further embodiment in schematic side view.

FIG. 2 shows an embodiment similar to that of FIG. 1, however several arrangements each consisting of wet deposition boxes 6 with a row 8 of suction boxes and sieve cylinders 18 and suction rolls 19 are serially arranged in order to obtain on one hand larger thicknesses and on the other, if desired, improved condensation.

In this case felt band 3 does not pass through the arrangement consisting of wet deposition boxes 6 and row 8 of suction boxes, rather it is processed by a lower cloth 29 rotating over deflection rollers 28 in this arrangement, this cloth receiving the fiber fleece 5 from wet deposition box 6 and transmitting it to the felt band 3 in the particular region between sieve cylinder 18 and suction roll 19. Lower cloth 29 always rotates in the sense of arrow 30, while felt band 3 moves in direction of arrow 31. A washing system 32 is provided for lower cloth 29 in every individual arrangement, this system is similar to apparatus 22 also consisting of one washing suction apparatus 24, one acid basin 24, a further washing suction apparatus 25 and a drying suction apparatus 26.

A further difference of the embodiment of FIG. 2 consists in that the drive of the felt band in this instance is not effected by either of the pressure rollers, rather by a separate drive 33 with a driven main roller 34 and a compressing roller 35.

Figure 3:
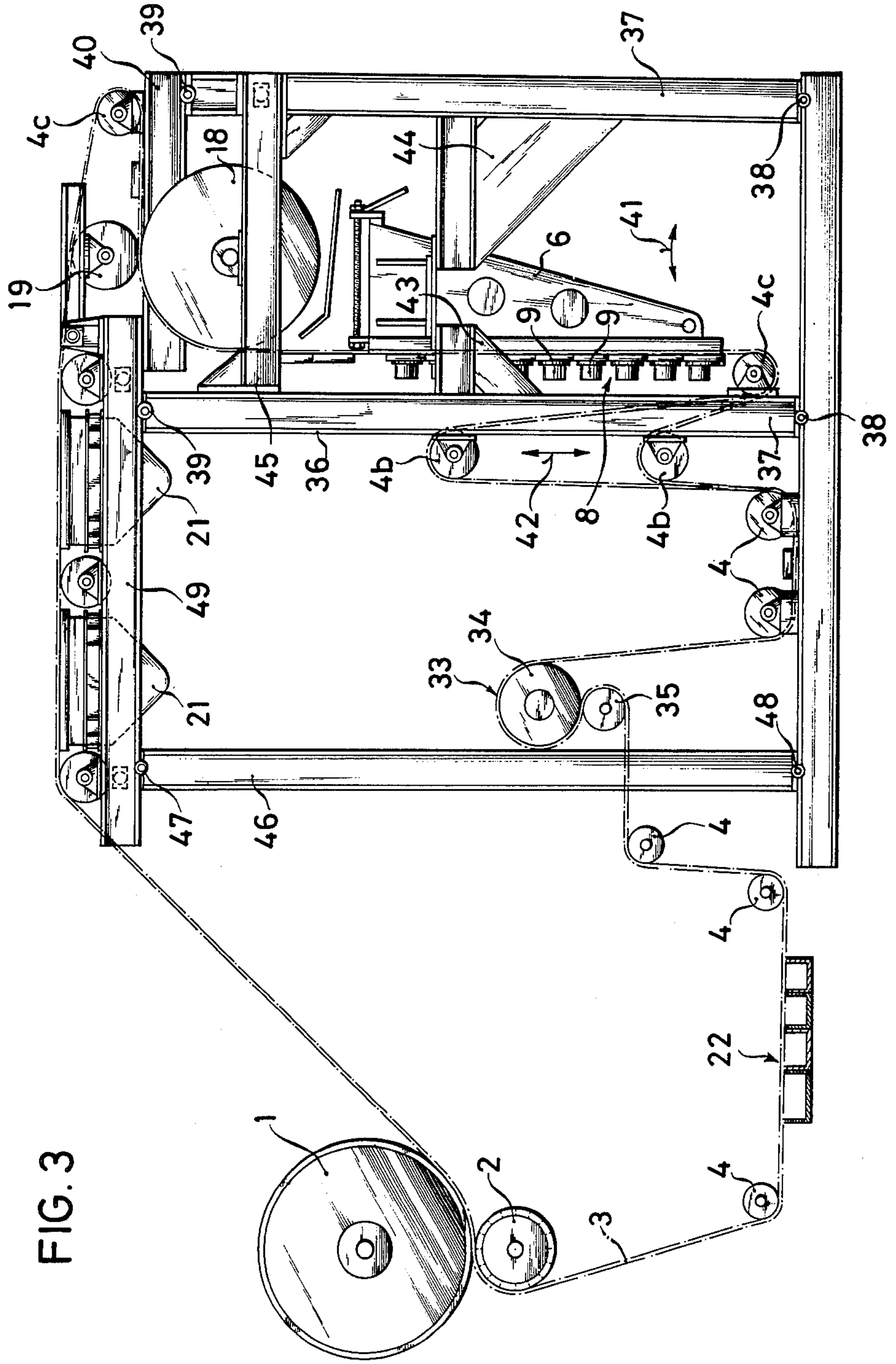
FIG. 3 is a design illustration for apparatus similar to that shown in FIG. 1.

FIG. 3 shows a design embodiment for the arrangements of FIGS. 1 or 2. As shown by FIG. 3, wet deposition boxes 6 and row 8 of suction boxes are mounted together with the individual suction boxes 9 in a structure 36 of which the vertical posts 37 run parallel to one another and are jointedly supported each at their lower ends at spatially fixed parts 38 of the structure, while their upper ends through joints 39 are connected by a traverse 40, so that they form a quadrilateral link. This allows parallelogram pivoting of posts 37 in the direction of arrow 41, so that feasibility of adjusting the slope of wet deposition box 6 and of row 8 of suction boxes is obtained. Posts 37 may be clamped in any particular position.

As shown further by FIG. 3, wet deposition box 6 together with row 8 of suction boxes is supported on brackets 43 and 44 mounted to structure 36 and detachably connected to these brackets, so that the wet deposition box may be easily exchanged separately or together with row 8 of suction boxes.

In the embodiment shown, the system consisting of sieve cylinder 18 and suction roll 19 also is supported on a traverse 45 connected to structure 36. Traverse 45 is jointedly connected with posts 37 if latter, as described above, may be adjusted in slope.

This structure may further carry dehydration system 21. If more posts 46 are required, they will also be jointedly connected at their upper and lower ends 47 and 48 with a traverse 49 holding dehydration system 21.

In order to allow small changes in slope without having to simultaneously perform other adjustments, at least one of deflection rollers **4*a* is mounted at the lower end of wet deposition box 6 or of row 8 of suction boxes in the vicinity of joint 38. If larger changes in slopes are required, at least one deflection roller 4*b* must be displaced. As indicated in FIG. 3, deflection roller 4*b* may be displaced in height in direction of arrow 42 at its associated post 37. Further rollers, for instance roller 4*c* above sieve cylinder 18, also may be mounted in displaceable manner and so as to be clamped at their settings. Lastly, the displacement of the deflection rollers may be coupled to the sloping motion of posts 37** by transmission means.

We claim:

1. A method for fabricating an asbestos-cement board comprising:

(a) passing a continuous felt band substantially vertically through a wet deposition box containing an aqueous asbestos-cement sludge and depositing fiber fleece from said asbestos-cement sludge onto said felt band by wet deposition on said felt band and applying suction from the side opposite of the felt band on which said fiber fleece is formed;

(b) applying said suction during the set deposition step to dewater the fiber fleece across a given length of the felt band at varying partial vacuum;

(c) further dewatering said fiber fleece deposit by passing said felt band and fiber fleece between a sieve cylinder and an associated suction roller operating in nip relationship; and (d) delivering said dewatered fiber fleece deposit on said felt band between a pair of press rollers in nip relationship to form said asbestos cement board and thereafter returning said felt band to step (a).

2. The method of claim 1, wherein the suction of step (a) takes place at low partial vacuum.

3. The method of claim 1, wherein the suction of steps (a) and (b) take place at varying partial vacuum across the width of the felt band.

4. An apparatus for fabricating an asbestos-cement board comprising:

(a) a continuous felt band with an outer side and an inner side;

(b) a wet deposition box for coating the outer side of said felt band with asbestos-cement fiber fleece and suction box means located on the inner side of said felt band with said felt band and fiber fleece therebetween;

(c) means for passing said felt band substantially vertically between said wet deposition box and said suction box;

(d) said suction box means comprising a plurality of individual boxes mounted sequentially in the direction of motion and having means for being operated with partial vacuum independently one from another;

(e) a sieve cylinder and an associated suction roller operating in nip relationship mounted vertically above said wet deposition box and said suction box and passing said felt band and fiber fleece therebetween;

(f) a pair of press rollers operating in nip relationship mounted for further passing the felt band therebetween and forming said fiber fleece into said asbestos-cement board; and (g) means for returning said continuous felt band to said wet deposition box.

5. The apparatus of claim 4, having a shield (10) mounted in said wet deposition box (6) opposite said felt band (3) and spaced parallel from the latter, defining a flow channel (11) between it and said felt band (3).

6. The apparatus of claim 5, wheein said shield (10) is adjustable transversely to the longitudinal axis of said band and with respect to the angle it subtends with said band.

7. The apparatus of claim 6, wherein said shield is provided with a curved rim (13) at its bottom.

8. The apparatus of claim 6, wherein said shield is an elastic membrane.

9. An apparatus for fabricating an asbestos-cement board comprising:

(a) a continuous felt band with an outer side and an inner side;

(b) a wet deposition box for coating the outer side of said felt band with asbestos-cement fiber fleece and suction box means located on the inner side of said felt band with said felt band and fiber fleece therebetween;

(c) means for passing said felt band between said wet deposition box and said suction box at a vertical angle to the horizontal;

(d) said suction box means comprising a plurality of individual boxes mounted sequentially in the direction of motion and having means for being operated with partial vacuum independently one from another;

(e) a sieve cylinder and an associated suction roller operating in nip relationship mounted vertically above said wet deposition box and said suction box and passing said felt band and fiber fleece therebetween;

(f) a pair of press rollers operating in nip relationship mounted for further passing the felt band therebetween and forming said fiber fleece into said asbestos-cement board; and (g) means for returning said continuous felt band to said wet deposition box.

10. The apparatus of claim 9, wherein said means for passing said felt band has means for angular adjustment.

11. The apparatus of claim 10, wherein said sieve cylinder and said associated suction roller are housed and supported in a structure holding said wet deposition box and said suction boxes said sieve cylinder and suction roller have means for angular adjustment.

* * * * *